United States Patent [19]
Bachmat

[11] Patent Number: 6,003,114
[45] Date of Patent: Dec. 14, 1999

[54] CACHING SYSTEM AND METHOD PROVIDING AGGRESSIVE PREFETCH

[75] Inventor: Eitan Bachmat, Hopkinton, Mass.

[73] Assignee: EMC Corporation, Hopkinton, Mass.

[21] Appl. No.: 08/877,700

[22] Filed: Jun. 17, 1997

[51] Int. Cl.[6] .................................................. G06F 12/00

[52] U.S. Cl. ..................... 711/113; 711/112; 711/133; 711/114

[58] Field of Search ................................... 711/133, 134, 711/135, 136, 137, 117, 118, 112, 113, 114; 395/872

[56] References Cited

U.S. PATENT DOCUMENTS

| | | | |
|---|---|---|---|
| 5,608,890 | 3/1997 | Berger et al. | 395/440 |
| 5,649,153 | 7/1997 | McNutt et al. | 395/445 |
| 5,671,444 | 9/1997 | Akkary et al. | 395/872 |
| 5,715,425 | 2/1998 | Goldman et al. | 395/445 |
| 5,828,820 | 10/1998 | Onishi et al. | 395/182.04 |

*Primary Examiner*—Eddie P. Chan
*Assistant Examiner*—Kimberly McLean
*Attorney, Agent, or Firm*—Richard A. Jordan; John M. Gunther

[57] ABSTRACT

A mass storage subsystem includes one or more data stores for storing information for access by one or more devices such as host computers, and a cache memory, and connects to a slave mass storage subsystem which provides mirrored storage for the information stored in its (that is, the mass storage subsystem's) data stores. When a host computer is to access information, the information is cached in the cache memory by the data stores, and the host computer will retrieve the information from the cache memory. In addition, the host computers can update information through the cache memory. Over a period of time, the mass storage subsystem gathers statistics relating to cache misses for respective chunks, each chunk comprising a relatively large number contiguous storage locations as maintained by the data stores, and will periodically cache information from entire chunks. Generally, if there is a relatively large number of cache misses for a chunk over a period of time, the chunk is being randomly accessed by the host computers, and, by caching the entire chunk, the likelihood of having a cache miss for that chunk will be eliminated. In addition, caching chunks in the slave mass storage subsystem's cache memory will increase the utilization of the cache memory of the slave mass storage subsystem.

18 Claims, 6 Drawing Sheets

SLAVE CACHE TABLE 80
STORAGE DEVICE IDFRS 80(c)
CYLINDER IDFRS 80(r)(c)

*FIG.3*

| CHUNK STATISTICS TABLE 70 | | | | | |
|---|---|---|---|---|---|
| CHUNK IDFR 71(0) | TOT ACC 72(0) | NUM RDS 73(0) | RD HIT RATE 74(0) | NUM MIS 75(0) | NUM WRTS 76(0) |
| CHUNK STATISTICS ENTRY 70(2) | | | | | |
| ... | | | | | |
| CHUNK STATISTICS ENTRY 70(E) | | | | | |

CACHING SYSTEM AND METHOD PROVIDING AGGRESSIVE PREFETCH

FIELD OF THE INVENTION

The invention relates generally to the field of digital data processing systems, and more particularly to caching systems and methods for use in mass storage subsystems for use in such systems.

BACKGROUND OF THE INVENTION

In modern "enterprise" computing environments, that is, computer systems for use in an office environment in a company, a number of personal computers, workstations, mini-computers and mainframe computers, along with other devices such as large mass storage subsystems, network printers and interfaces to the public telephony system, may be interconnected to provide an integrated environment in which information may be shared among users in the company. Typically, users may be performing a variety of operations, including order receipt, manufacturing, shipping, billing, inventory control, and other operations, in which sharing of data on a real-time basis may provide a significant advantage over, for example, maintaining separate records and attempting to later reconcile them. The users may operate on their own data, which they may maintain on the computers they are using, or alternatively they may share data through the large mass storage subsystems.

Given the importance of the availability of information to an enterprise, several strategies have been developed to provide for enhanced safety and availability of data stored in a mass storage system in the event of a failure or other malfunction. In one strategy, data stored on, for example, a disk storage subsystem will be periodically backed up onto another, less expensive medium, such as magnetic tape. While such a strategy can be provide some use protection, it does suffer some drawbacks. First, since the data is only periodically backed up, data that has been updated or modified since the last backup will not be protected. In addition, for a large mass storage subsystem, the time required to perform a back-up can be quite long, which can interfere with access to the mass storage subsystem by others in the enterprise. In addition, if a failure or other malfunction does occur, if the mass storage subsystem is large the time required to transfer the information from the tape to another mass storage subsystem for use by the enterprise can be quite lengthy.

Other strategies for providing enhanced safety and availability for the information stored on disk storage subsystems make use of additional disks drives and spreading the information across the disk drives. In one such strategy, termed "RAID" (an acronym for "Redundant Array of Inexpensive Disks") information is striped across a plurality of disk drives. At least one additional disk drive, than those required for the information, is provided to store parity or other error correction information so that, if one of the disk drives in the mass storage subsystem fails or otherwise malfunctions, the information from the other disk drives, along with the parity information from the additional disk drive, can be used to regenerate the information that had been stored on the malfunctioning disk drive. While a RAID strategy can be useful in providing enhanced safety and availability, it does require complex and sophisticated controller arrangements for efficiently striping the information across the respective disk drives and generating the appropriate parity information for storage on the additional disk drive.

A second such strategy, termed "mirroring," provides safety and availability of information at least as well as, if not better than, that provided by the RAID strategy, while potentially requiring far less sophisticated controllers. In mirroring, the entire contents of one, for example, mass storage subsystem, are replicated on one or more other mass storage subsystems. Thus, if one or more disk drives on one of the mass storage subsystems fails, the information is immediately available to the enterprise from the another mass storage subsystem. Thus if a catastrophic failure occurs at one mass storage subsystem, such as the failure or malfunction of a number of disk drives or destruction of the entire mass storage subsystem, in a mirrored arrangement the information would still be available from the another mass storage subsystem, which may not be possible in a RAID system. The mirrored mass storage subsystems may be physically located proximate to each other. Alternatively, the mirrored mass storage subsystem, may be separated by a significant distance, which will allow information to be available from at least one mass storage subsystem even if the other is destroyed by fire, natural disaster, or the like, which also would not be possible in a RAID system.

One mass storage subsystem useful in such an enterprise is described in, for example, U.S. Pat. No. 5,206,939, entitled System And Method For Disk Mapping And Data Retrieval, issued Apr. 27, 1993 to Moshe Yanai, et al (hereinafter, "the '939 patent"), U.S. patent application Ser. No. 07/893,509 filed Jun. 4, 1995, in the name of Moshe Yanai, et al., entitled "System And Method For Dynamically Controlling Cache Management," and U.S. Pat. No. 5,592,432, entitled Cache Management System Using Time Stamping For Replacement Queue, issued Jan. 7, 1997 in the name of Natan Vishlitzky, et al., (hereinafter "the '432 patent"), all of which are assigned to the assignee of the present invention and incorporated herein by reference. Those applications and the patent generally describe an arrangement which allows data, as used by computers, organized in records, with each record being in well-known "CKD" ("count-key-data") format, to be stored in storage devices which provide a "fixed block" storage architecture. In this arrangement, a large cache is used to buffer information that is transferred from the storage devices for use by the respective computers, and, if the data has been modified, transferred back from to the storage devices for storage. If such a mass storage subsystem is used in a mirrored arrangement, one of the mass storage subsystems, termed here a "master" subsystem, may be used to service retrieval and storage requests, and the other mass storage subsystem, termed here a "slave" subsystem, may be used to provide mirroring for the information in the master subsystem. In that case, generally, the cache of the master subsystem will be used to buffer both information for retrieval requests and storage requests, whereas the cache for the slave subsystem will generally buffer only information for storage requests, which have been provided thereto by the master subsystem for storage. In such an arrangement, the cache of the slave subsystem may be under-utilized.

SUMMARY OF THE INVENTION

The invention provides a new and improved caching system and method for use in mass storage subsystems for use in such digital computer systems, the caching system providing an aggressive prefetching of relatively large chunks of information based on the historical usage of information generally widely or randomly distributed throughout the chunk.

In brief summary, a mass storage subsystem in accordance with the invention includes one or more data stores for storing information for access by one or more devices such as host computers, and a cache memory. When a host computer is to access information, the information is cached in the cache memory by the data stores, and the host computer will retrieve the information from the cache memory. In addition, the host computers can update information through the cache memory. Over a period of time, the mass storage subsystem gathers statistics relating to cache misses for respective chunks, each chunk comprising a relatively large number contiguous storage locations as maintained by the data stores, and will periodically cache information from entire chunks. Generally, if there is a relatively large number of cache misses for a chunk over a period of time, the chunk is being randomly accessed by the host computers, and, by caching the entire chunk, the likelihood of having a cache miss for that chunk will be eliminated.

In one embodiment, the mass storage subsystem enables the selected chunks to be cached in a cache memory maintained by a slave mass storage subsystem which provides mirrored storage for the information in the one mass storage subsystem, so as to increase the utilization of the cache memory of the slave mass storage subsystem.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
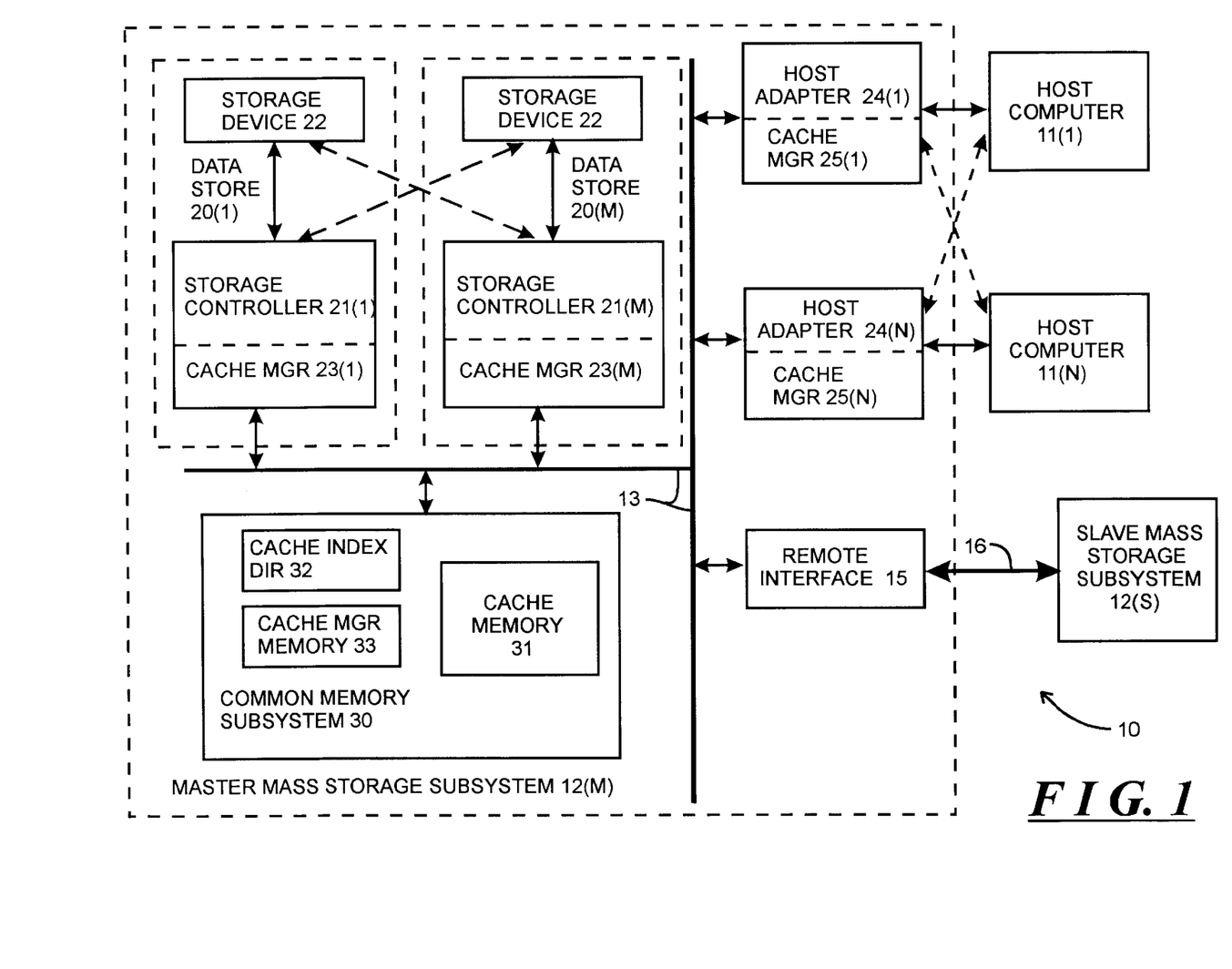
FIG. 1 is a functional block diagram of a digital computer system, including a storage subsystem constructed in accordance with the invention.

The invention will be described in connection with a digital computer system 10 depicted in functional block diagram form in FIG. 1. With reference to FIG. 1, computer system 10 includes a plurality of host computers 11(l) through 11(N) (generally identified by reference numeral 11(n)) connected to a master mass storage subsystem 12M. Each host computer 11(n) may comprise, for example, a personal computer, workstation, or the like which may be used by a single operator, or a multi-user computer system which may be used by a number of operators. The master mass storage subsystem 12M stores data and other information that is utilized by the host computers 11(n) in their processing, and stores processed or otherwise updated information transferred to it by the host computers 11(n) for storage. The master digital data storage system 12M, in turn, is connected over a communication link 16 to a slave mass storage subsystem 12S which provides mirrored storage for the information stored in the master mass storage subsystem 12M.

The master mass storage subsystem 12M in one embodiment is generally similar to the mass storage subsystem described in U.S. Pat. No. 5,206,939, entitled System And Method For Disk Mapping And Data Retrieval, issued Apr. 27, 1993 to Moshe Yanai, et al (hereinafter, "the '939 patent"). The slave mass storage subsystem 12S, in one embodiment, is also similar to the mass storage subsystem described in the '939 patent, and is also similar to master mass storage subsystem 12M, with such exceptions as will be noted below. The master mass storage subsystem 12M comprises one or more data stores 20(l) through 20(M) (generally identified by reference numeral 20(m)), one or more host adapters 24(l) through 24(N) (generally identified by reference numeral 24(n)), and a common memory subsystem 30, all of which are interconnected by one or more common buses generally identified by reference numeral 13. The master mass storage subsystems 12M also includes a remote interface 15 for communicating over communication link 16 with the slave mass storage subsystem 12S as described below.

The host adapters 11(n) operate to interface the host computers 11(n) to the master mass storage subsystem 12M, and in that connection receive storage and retrieval requests from the respective host adapters 11(n), transfer (in the case of a storage operations) the information to be stored to other components of the subsystem 12 for storage, and retrieve (in the case of a retrieval operation) the information to be retrieved from other components of the subsystem 12 for provision to the respective host computer 11(n). Generally, retrieval operations and storage operations in connection with the master mass storage subsystem 12M will collectively be referred to as "access operations."

The data stores 20(m) store information in the form of records, which, in one embodiment, are in the well-known "CKD" (count-key-data) format. The common memory subsystem 30 operates as a cache to cache information from the data stores 20(m), and, as will be described below in greater detail, in performing the retrieval and storage operations, the host adapters 24(n) operate to retrieve information from, and store information in, the common memory subsystem 30. If the particular record in the data store 20(m) which is to be retrieved during a retrieval operation, or which is to be updated during a storage operation, is not cached in the common memory subsystem 30, the respective host adapter 24(n) and the appropriate data store cooperate as necessary to enable the record to be cached, after which the host adapter 24(n) can retrieve information from (in the case of a retrieval operation) or store updated information in (in the case of a storage operation) the common memory subsystem 30. In these operations, the host adapters 24(n), data stores 20(m) and common memory subsystem 30 communicate over the common bus 30, and in one embodiment access to the bus 13 is controlled by bus access control circuitry distributed among these components. In controlling access to the bus 13, the bus access control circuitry may use any of a number of known bus access arbitration techniques.

Each data store 20(m) includes a storage controller 21(m) and one or more storage devices generally identified by reference numeral 22. The storage devices 22 may comprise any of the conventional magnetic disk and tape storage devices, as well as optical disk storage devices and CD-ROM devices from which information may be retrieved. Each storage controller 21(m) connects to bus 13 and controls the storage of information which it receives thereover in the storage devices 22 connected thereto. In addition, each storage controller 21(m) controls the retrieval of information from the storage devices 22 which are connected thereto for transmission to the common memory subsystem 30 for storage. In one embodiment, in which the storage devices 22 comprise magnetic disk storage devices, each storage device 22 stores information on disks organized in a plurality of cylinders, with each cylinder comprising one or more tracks, each of which can generally store one or more records.

As noted above, the common memory subsystem 30 operates to cache information from the data stores 20(m) for access by the hosts computers 11(n) through the host adapters 24(n). The common memory subsystem 30 includes a cache memory 31, a cache index directory 32 and a cache manager 33, which are generally similar to those described in U.S. patent application Ser. No. 07/893,509 filed Jun. 4, 1995, in the name of Moshe Yanai, et al., entitled "System And Method For Dynamically Controlling Cache Management," U.S. Pat. No. 5,592,432, entitled Cache Management System Using Time Stamping For Replacement Queue, issued Jan. 7, 1997 in the name of Natan Vishlitzky, et al., and U.S. patent application Ser. No. 08/523,657, filed Sep. 5, 1995, in the name of Yuval Ofek and Natan Vishlitzky, and entitled "Cache Management System", (Atty. Docket No. 95-018) (hereinafter referred to as the "Ofek application"), all of which are assigned to the assignee of the present invention and incorporated herein by reference. The cache memory 31 operates as a cache buffer in connection with storage and retrieval operations, in particular caching update information provided by the host adapters 24(n) during a storage operation and information received from the data stores 20(m) which may be retrieved by the host adapters 24(n) during a retrieval operation.

Figure 2:
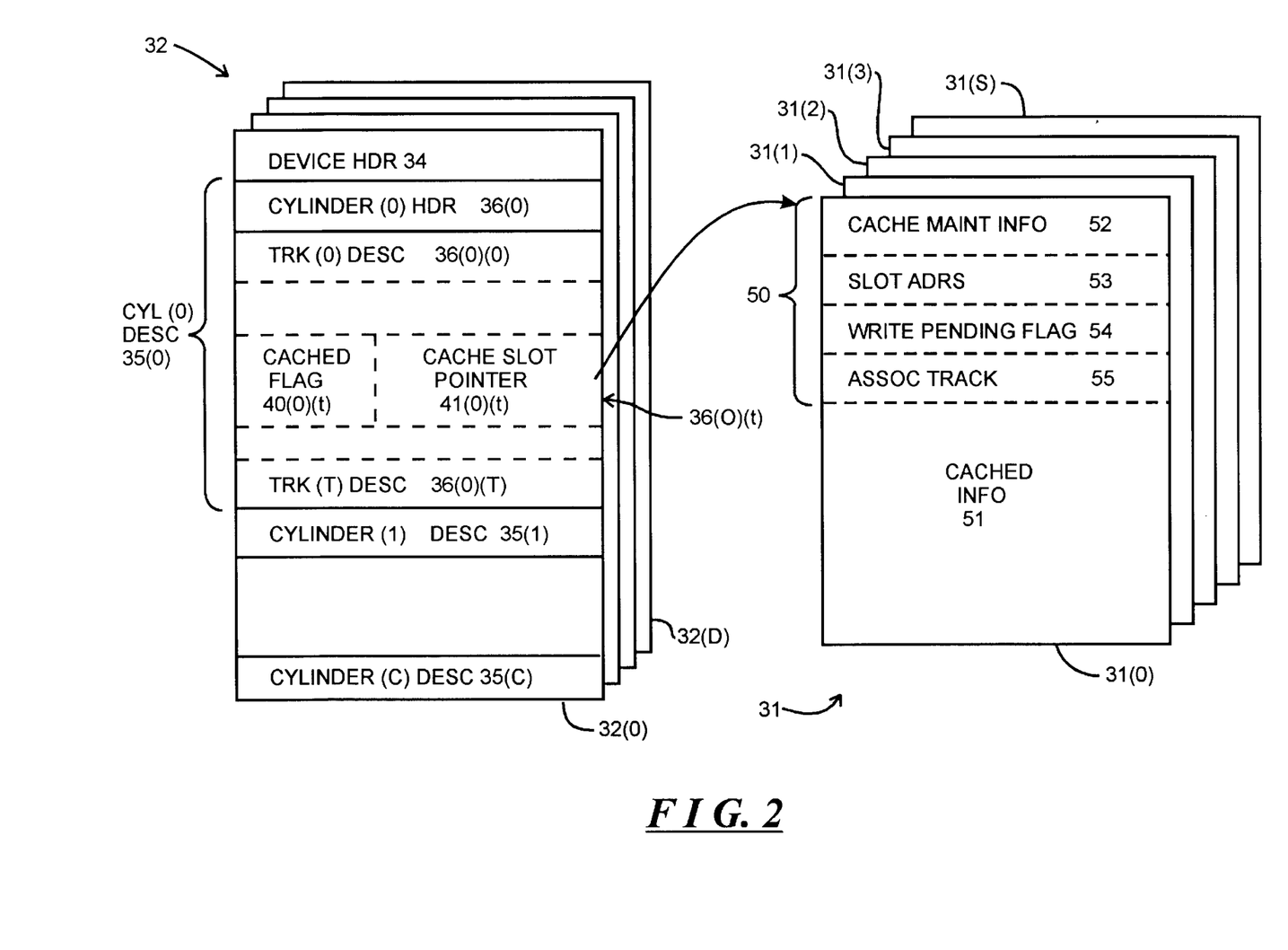
FIG. 2 depicts the organization of a cache memory and cache index directory useful in understanding the operation of the storage subsystem depicted in FIG. 1.

The cache memory 31 and cache, index directory 32 will generally be described in connection with FIG. 2. With reference to FIG. 2, the cache memory 31 includes a plurality of storage locations, which are organized in a series of cache slots 31(O) through 31(S) (generally identified by reference numeral 31(s)). The storage locations are, in turn, identified by a series of addresses, with the starting address of each cache slot being identified by a base address. The cache slots 31(s) provide the cache buffering for the information common memory subsystem 30 as described above.

The cache index directory 32 operates as an index for the cache slots 31(s) in the cache memory 31. The cache index directory 32 includes a plurality of cache index tables 32(O) through 32(D) (generally identified by reference numeral 32(d)), each of which is associated with one of the storage devices 22 in the storage subsystem 12. Each cache index table 32(d) includes a device header field 34, which provides, for example, selected identification and status information for the device 22 associated with the cache index table 32(d). In addition, each cache index table 32(d) includes a plurality of cylinder descriptors 35(l) through 35(C) (generally identified by reference numeral 35(c)) each of which is associated with one of the cylinders in the storage device 22 that is associated with the cache index table 32(d). Each cylinder descriptor 35(c), in turn, includes a cylinder header 36(c), which provides, for example, selected identification and status information for the cylinder associated with the cylinder descriptor 35(c).

In addition, each cylinder descriptor 35(c) includes a plurality of track descriptors 35(c)(O) through 35(c)(T) (generally identified by reference numeral 35(c)(t)), each of which is associated with one of the tracks in the cylinder 35(c). Each track descriptor 35(c)(t), in turn, includes information for the associated track of the storage device 22, including whether the track is associated with a cache slot 31(s) in the cache memory 31, and, if so, the identification of the cache slot 31(s) with which the track is associated. In one embodiment, each track descriptor 35(c)(t) includes a cached local flag 40(c)(t), a cache slot pointer 41(c)(t), and may also include other status and control information (not separately shown). The cached local flag 40(c)(t), if set, indicates that the track associated with the track descriptor 35(c)(t) is, in turn, associated with a cache slot. If the cached local flag 40(c)(t) is set, the cache slot pointer 41(c)(t) points to one of the cache slots 31(s), thereby associating the track with the respective cache slot 31(s). If the cached local flag 40(c)(t) is set, information from the track can be cached in the cache slot 31(s) identified by the cache slot pointer 41(c)(t) for retrieval by a host adapter 24(n) and updated information can be stored by a host adapter 24(n) in the cache slot 31(n) for later storage on the associated track storage.

Each cache slot 31(s) includes a cache slot header 50 and a cached information storage portion 51. Generally, the cached information portion 51 contains the information that is cached in the cache slot 3l(s) for the track that is associated with the cache slot 31(s). The header portion 50 generally contains information concerning the cache slot 31(s), including information used to maintain the ordering of the cache slots in connection with the particular cache slot replacement algorithm selected for the cache memory 31, the identification of the track associated with the cache slot and information as to whether the cache slot contains updated information from a host adapter 24(n) which needs to be stored on the track associated with the cache slot 31(s).

More specifically, the cache slot's header portion 50 includes a cache maintenance information field 52, a slot address field 53, a write pending field 54, and an associated track identifier field 55, and may also include other status and control information (not separately shown). The cache maintenance information field 52 contains information used in connection with the particular cache slot replacement algorithm which is selected for the cache memory 31. For example, if a least-recently-used cache slot replacement algorithm or modified least-recently-used is used for the cache memory 31, the cache maintenance information field 52 will be used to link the cache slots 31(s) in the cache memory 31 in a doubly-linked list of cache slots, effectively linking the cache slots in an order corresponding to that in which they were most recently accessed by a storage controller 21(m) or host adapter 24(n). (The aforementioned Shagam and Ofek applications describe modified least-recently-used cache-slot replacement algorithms which can be used in one embodiment of the invention). The slot address field 53 identifies the address of the cache slot 31(s) in the cache memory 31. The write pending flag 54, if set, indicates that the cache slot contains updated information which needs to be transferred to the respective storage device 22 for storage on the associated track. If the write pending flag 74 is not set, the cache slot 31(s) does not contain updated information. It will be appreciated that, if the write pending flag 74 of the cache slot 31(s) is set, as described above, the cache maintenance information field 52 for the cache slot 31(s) will be updated so as to remove the cache slot 31(s) from the set of cache slots 31(s) which may be available for re-use in connection with the cache replacement algorithm selected for the cache memory 31 until the updated information has been stored on the associated track. After the updated information has been stored on the associated track, the write pending flag 54 can be cleared and the cache maintenance information field 52 can be updated to return the cache slot 31(s) to the list of cache slots 31(s) which are available for re-use. This will ensure that the cache slot 31(s) will not be re-used, in accordance with the cache slot replacement algorithm used for the cache memory 31 while the cache slot 31(s) contains updated information which has not been stored on the storage device 22.

Each of the host adapters 24(n) and each of the device controllers 21(m) includes a cache manager 25(n) and 23(m), respectively, to access to the cache memory 31, cache index directory 32 and cache manager memory 33. The particular operations performed during an access operation will depend on a number of factors, including the access operation to be performed, whether or not the information from the particular track to be accessed is cached in the cache memory 31, and whether or not the information in the respective cache slot 31(s) has been modified or updated by a host adapter's cache manager 25(n) during a storage operation. As described in the aforementioned Shagam application, the host adapters 24(n) typically perform storage and retrieval operations in connection with information that has been cached in the cache memory 31, and the device controllers 21(m) perform "staging" and "de-staging" operations to transfer information in the storage devices 22 to the cache memory 31 for buffering (the staging operations) and to transfer information from the cache memory 31 to the storage devices 22 for storage (the de-staging operations). In performing the staging and de-staging operations, the device controllers 21(m) generally transfer information to and from the cache memory 31 in units of at least a record, that is, they will during a staging operation transfer all of the information in a record from a storage device 22 to a cache slot 31(s) in the cache memory 31, and during a de-staging operation copy all of the information in respective updated records in the cache memory 31 to the storage device 22 for storage on the associated track.

The cache manager memory 33 maintains a number of work lists which are used to control operations by the host adapters 24(n) and storage controllers 21(m) during an access operation. In particular, the cache manager memory 33 includes a cache slot replacement list, a pending write list and various lists which the host adapters 24(n) and storage controllers 21(m) use to communicate to coordinate staging operations (not shown). It will be appreciated that the various lists maintained by the cache manager memory 33 may comprise any of a number of convenient forms, including queues, trees, stacks or the like. The cache slot replacement list is used to control re-use of cache slots in accordance with the cache-slot replacement algorithm selected for cache memory 31. During a staging operation, the storage controller's cache manager 23(m) uses the cache slot replacement list to select a cache slot 31(s) into which it will load the information retrieved from a storage device. If the cache slot 31(s) does not contain updated information which has not been written to the storage device 22 which contains the track associated with the cache slot 31(s), it (that is, the cache slot 31(s) will be linked to the cache slot replacement list.

The pending write list is used to identify cache slots 31(s) which contain updated information, which has not been written to the storage device which contains the track associated with the cache slot 31(s). When a cache slot 31(s) contains updated information to be transferred to a storage device 22 as described above, it will be linked into the pending write list, not to the cache slot replacement list. During de-staging operations, the storage controllers' cache managers 23(m) will use the write pending list to identify cache slots which contain updated information which is to be written to the appropriate respective storage devices 22.

The staging operation coordination communication lists include a plurality of stage request lists and a plurality of stage completion lists, with one stage request list being associated with each data store 20(m) and one stage completion list being associated with each host computer 11(n). The host adapters' cache managers 25(m) use the stage request lists to store stage requests to be performed by the respective data stores 20(m), and the data stores' cache managers 23(n) use the stage completion lists to store stage completion messages to indicate to the respective host adapters' cache managers 25(m) that the stage, requests have been completed.

Generally, a host adapter 24(n), during a retrieval operation, attempts to retrieve the information from the cache memory 31. However, if the information is not in the cache memory 31, it will enable the device controller 21(m) which controls the storage device 22 that contains the information to be retrieved to "stage" the information from the track which contains the information to be retrieved, that is, to enable the transfer of the information to be retrieved from the track which contains the information that is to be retrieved, into a cache slot 31(s) in the cache memory 31. In that process, the host adapter 24(n) may select a cache slot 31(s) to be used by the storage controller 21(m) into which the data is to be staged, the selection being made from the cache slot replacement list as described above. After the information to be retrieved is in the cache slot 31(s) in the cache memory 31, the host adapter 24(n) will retrieve the information from the cache slot 31(s).

Similarly, during a storage operation, the host adapter 24(n) will store the information in a cache slot 31(s). If the track containing the record to be updated is associated with a cache slot when the host adapter 24(n) initiates a storage operation, as will be indicated by the cached local flag 40(c)(t) in the track's descriptor 36(c)(t) in the cache index directory 32, the host adapter 24(n) will store the updated information in the cache slot 31(s) associated with the track, as identified by the cache slot pointer 41(c)(t); this may occur, for example, if information from the track has recently been staged in the cache memory 31 or if the same or another record stored on the track has recently been updated. However, if the track is not associated with a cache slot when the host adapter 24(n) initiates a storage operation, the host adapter 24(n) will select a cache slot to be associated with the track, and store the updated information in the selected cache slot.

More specifically, as described in the aforementioned Shagam application, during a retrieval operation, the cache manager 25(n) of the initiating host adapter 24(n) will initially access the cache index table 32(d) in the cache index directory 32 associated with the storage device 22 in which the information to be retrieved is stored, in particular accessing the track descriptor 36(c)(t) of the cylinder descriptor 36(c) to determine, from the condition of the cached local flag 40(c)(t), whether the information from the track is cached in a cache slot 31(s) in the cache memory. If the cached local flag 40(c)(t) indicates that information from the track is cached in a cache slot 31(s), the cache manager 25(n) uses the cache slot pointer 41(t) to identify the particular cache slot 31(s) in which the information is cached and retrieves the required information from the cache slot 31(s).

On the other hand, if the cache manager 25(n) determines from the cached local flag 40(c)(t) that the information from the track is not cached in a cache slot 31(s), it will generate a stage request to enable the storage controller 21(m) for the storage device 22 which maintains the information to be retrieved, load the stage request in the stage request queue for the data store 21(m) and notify the storage controller 21(m) that a stage request had been loaded in the stage request queue. At some point after receiving the notification, the storage controller 21(*m*) will retrieve the stage request and perform a staging operation in response thereto. In performing the staging operation, the storage controller 21(*m*) will retrieve the information from the requested track, use the above-described cache slot replacement list to select a cache slot 31(*s*), load the information into cache slot 31(*s*) and update the track descriptor 36(*c*)(*t*) in the cache index table 32(*d*) associated with the storage device 22 to indicate that the information from the track is in the cache slot 31(*s*), in particular setting the cached local flag 40(*c*)(*t*) and loading a pointer to the cache slot in the cache slot pointer 41(*c*)(*t*).

After the storage controller 21(*m*) has completed the staging operation, it will load a staging completed message in the stage completion list in the cache manager memory 33 associated with the host computer 11(*n*) which issued the staging request, and notify the host computer's cache manager 25(*n*) that a stage completed message has been loaded therein. At some point after receiving the notification, the host computer's cache manager 25(*n*) can repeat the operations performed in connection with the retrieval request as described above, in particular accessing the cache index table 32(*d*) in the cache index directory 32 associated with the storage device 22 in which the information to be retrieved is stored, in particular accessing the track descriptor 36(*c*)(*t*) of the cylinder descriptor 36(*c*) to determine, from the condition of the cached local flag 40(*c*)(*t*), whether the information from the track is cached in a cache slot 31(*s*) in the cache memory and, if so, use the cache slot pointer 41(*t*) to identify the particular cache slot 31(*s*) in which the information is cached and retrieve the required information from the cache slot 31(*s*). Since at this point the cached local flag 40(*c*)(*t*) should indicate that the information from the track is cached in a cache slot 31(*s*), the host adapter's cache manager 25(*n*) should be able to complete the retrieval operation.

During a storage operation, the cache manager 25(*n*) of the initiating host adapter 24(*n*) will initially access the cache index table 32(*d*) in the cache index directory 32 associated with the storage device 22 in which the information to be updated is stored, in particular accessing the track descriptor 36(*c*)(*t*) of the cylinder descriptor 36(*c*) to determine, from the condition of the cached local flag 40(*c*)(*t*), whether the information from the track is cached in a cache slot 31(*s*) in the cache memory. If the cached local flag 40(*c*)(*t*) indicates that information from the track is cached in a cache slot 31(*s*), the cache manager 25(*n*) uses the cache slot pointer 41(*t*) to identify the particular cache slot 31(*s*) in which the information is cached and loads the update information into the cache slot 31(*s*). In addition, the host adapter's cache manager 25(*n*) will remove the identification of the selected cache slot 31(*s*) from the replacement list to the pending write list so that the cache slot 31(*s*) will not be re-used until a de-staging operation has been performed in connection with the cache slot 31(*s*).

On the other hand, if the cache manager 25(*n*) determines from the cached local flag 40(*c*)(*t*) that the information from the track is not cached in a cache slot 31(*s*), it will select a cache slot 31(*s*) to associated with the track from cache slot replacement list and store the updated information in the cache slot 31(*s*). In selecting the cache slot 31(*s*), the cache manager 25(*n*) will update the track descriptor 36(*c*)(*t*) in the cache index table 32(*d*) associated with the storage device 22 to indicate that the information from the track is in the cache slot 31(*s*), in particular setting the cached local flag 40(*c*)(*t*) and loading a pointer to the cache slot 31(*s*) in the cache slot pointer 41(*c*)(*t*). In addition, the cache manager 25(*n*) will update the cache maintenance information field 52 to link the selected cache slot to the write pending list instead of the cache slot replacement list, and will set the write pending flag 54.

As described above, the data stores' cache managers 23(*m*) also perform de-staging operations using the pending write list to identify cache slots 31(*s*) which contain updated information to be written back to the original storage device 22 and track whose information was cached in the respective cache slots 31(*s*). When a cache slot 31(*s*) is de-staged, since at that point the information in the cache slot 31(*s*) corresponds to the information on the respective storage device 22, the data store's cache manager 23(*m*) which performs the de-staging operation will remove the cache slot's identification from the pending write list and return it to the replacement list so that the cache slot 31(*s*) can be removed. It will be appreciated, however, that a host computer's cache manager 25(*n*) may perform a number of retrieval operations and/or storage operations in connection with information in the same cache slot 31(*s*) after the information in the track cached in the slot has been staged and before it can be de-staged, and so information in a cache slot 31(*s*) can be updated a number of times before it is de-staged. In addition, it will be appreciated that after a cache slot 31(*s*) has been de-staged, it may also be updated during a storage operation before the cache slot 31(*s*) is re-used during a staging operation. When that occurs however, since, as described above, the host computer's cache manager 25(*m*) removes the cache slot's identification from the replacement list and placed it on the write pending list as part of the storage operation, the cache slot 31(*s*) will be subject to another de-staging operation before it can be re-used. Thus, a particular cache slot 31(*s*) may be subject to de-staging a number of times with information cached for the same storage device 22, cylinder and track, without being reused.

In addition, in one embodiment one or more of the cache slots 31(*s*) may be permanently associated with respective ones of the tracks in the storage devices 22, and in that connection will not be available for re-use in connection with the selected cache slot replacement algorithm. This may be done, for example, at the request of a host computer 11(*n*) which may be aware that the information contained on the track will be accessed relatively often, or that it will need access to the information with a minimum latency period which may not be available if the information in the track would need to be transferred from the respective storage device 22, or for other reasons which will be apparent to those skilled in the art. To accommodate that, the header 50 of the cache slot 31(*s*) is also provided with a permanently cached flag (not separately shown) which, if set, indicates that the cache slot 31(*s*) is not available for re-use. Such a cache slot 31(*s*) will, if a host adapter 24(*n*) updates the information contained therein, be linked to the write pending list so that the updated information contained therein can be de-staged; however, after the updated information has been de-staged, the cache slot 31(*s*) will not be linked to the cache slot replacement list.

As noted above, the slave mass storage subsystem 12S is generally similar to master mass storage subsystem 12M. In the embodiment depicted in FIG. 1, the slave mass storage subsystem 12S does not connect to host computers 11(*n*), and thus need not include host adapters 24(*n*) and associated cache managers 25(*n*). The slave mass storage subsystem 12S will, however, include data stores, a common memory subsystem similar to that described above, and a remote interface for enabling the slave mass storage subsystem 12S to communicate with the master mass storage subsystem 12M over the communication link 16. The data stores in the slave mass storage subsystem will store a copy of the information stored in the data stores 20(m) of the mass storage subsystem 12M in a mirrored manner. To accomplish the mirroring, when a host adapter 24(n) in the master mass storage subsystem 12M performs a storage operation to store update data for a particular track in the master mass storage subsystem's cache memory 31 as described above in connection with FIGS. 1 and 2, it also enables the remote interface 15 to transfer a storage request over the communication link 16 to the slave mass storage subsystem 12S. In response to the storage request, the slave mass storage subsystem's remote interface will perform a corresponding storage operation in connection with the slave mass storage subsystem 12S to enable the updated information to be stored in the slave mass storage subsystem's cache memory. At some point later, the appropriate data store in the slave mass storage subsystem's will perform a de-staging operation as described above, to transfer the update information appropriate storage device of the slave mass storage subsystem which, in turn, stores the update information on the appropriate track.

Generally, a slave mass storage subsystem such as subsystem 12S is only used to perform storage and de-staging operations in connection with storage requests received from the mass storage subsystem 12M so that updated information stored by the host adapters 24(n) on the master mass storage subsystem 12M will also be stored on the slave mass storage subsystem 12S, thereby to maintain the information stored in the master mass storage subsystem 12M in a mirrored condition on the slave mass storage subsystem 12S. In that case, since such storage operations are normally performed at a much lower rate than retrieval operations, the cache memory in the slave mass storage subsystem 12S would not otherwise be extensively used. In accordance with the invention, the cache memory of the slave mass storage subsystem 12S can be used to cache large chunks of information from the slave mass storage subsystem's storage devices, for access by the host adapters 24(n), in an aggressive prefetch operation. This can be useful if, for example, accesses over a relatively long period of time are directed to relatively randomly-distributed tracks in the storage devices 22 of the master mass storage subsystem 12M, such that the master mass storage subsystem 12M would need to perform a relatively large number of staging operations in connection therewith. If the accesses are directed to a chunk comprising a relatively large number of contiguous tracks or other large logical portion of a respective storage device 22, then caching the information from an entire chunk in the slave mass storage subsystem's cache memory and allowing the host adapters 24(n) to access the information from those chunks from the slave mass storage subsystem's cache memory, can provide a significant performance advantage over requiring staging operations to transfer the information from a respective storage device in either the master mass storage subsystem 12M or the slave mass storage subsystem 12S. In one particular embodiment, the chunks are selected to be some relatively large non-overlapping fraction, such as one-fourth or one-eighth, of the logically-contiguous tracks on a respective storage device. The particular chunks which are cached by the slave mass storage subsystem 12S can, for example, be changed periodically at the end of at least relatively long time intervals, on the order of hours, with the selections as to the particular chunks which are to be cached being based on statistics gathered for access operations in the master mass storage subsystem 12M during, for example, the preceding time interval.

Figure 3:
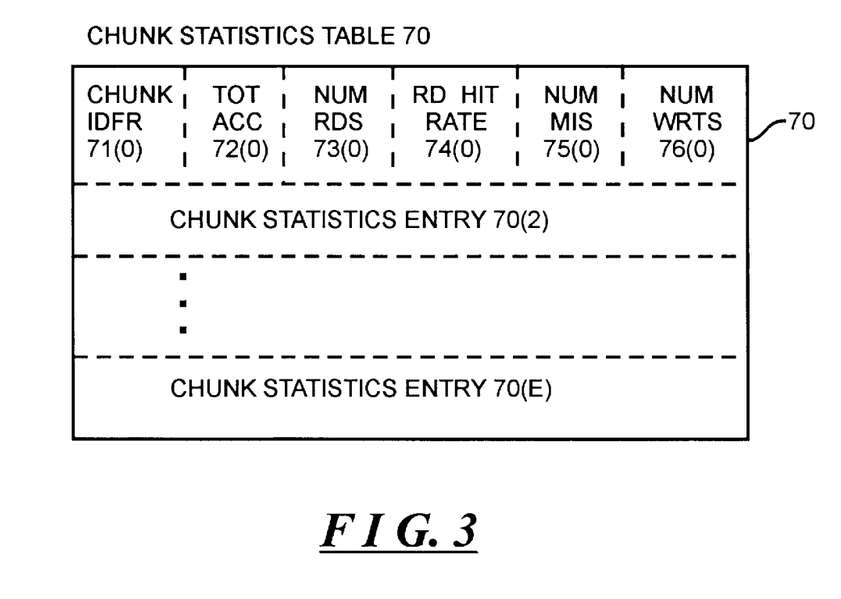
FIGS. 3 and 4 depict the structures of a chunk statistics table and a slave track table which are useful in understanding the invention.
Figure 4:
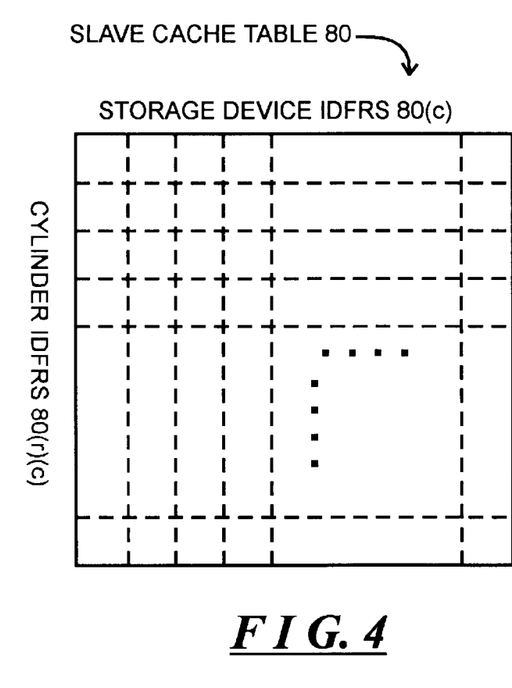

To accommodate the invention, the master mass storage subsystem 12M is provided with two additional tables, namely, a chunk statistics table 70, depicted in FIG. 3, and a slave cache table 80, depicted in FIG. 4, both of which can be stored in the common memory subsystem 30 (FIG. 1). The chunk statistics table 70 is used to gather statistics for each chunk during each respective time interval, which statistics are used to select the chunks to be cached for the next time interval. The slave cache table 80 is used to identify, at any point in time, the particular tracks of the chunks which are cached in the slave mass storage subsystem's cache memory, thereby enabling the host adapters 24(n) to determine which tracks are cached in the slave mass storage subsystem's cache memory when they are performing a retrieval operation.

With reference to FIG. 3, the chunk statistics table 70 includes a plurality of entries 70(l) through 70(E) (generally identified by reference numeral 70(e)), with one entry 70(e) being provided for each chunk of the storage devices 22. Each entry 70(e) is used to gather statistics for the associated chunk during each respective time interval. Each entry 70(e) includes a number of fields, including a chunk identifier field 71(e), a total accesses field 72(e), a number of reads field 73(e), a read hit rate field 74(e), a number of misses field 75(e), and a number of writes field 76(e). The chunk identifier field 71(e) stores a chunk identifier value which identifies the storage device 22 and the particular chunk of the storage device 22 that is associated with the entry 70(e). The total accesses field 72(e) identifies the number of accesses for the tracks in the particular chunk since the beginning of the time interval, the number of reads field 73(e) identifies the number of retrieval operations in connection with tracks in the particular chunk since the beginning of the time interval, and the number of writes field 76(e) identifies the number of storage operations in connection with tracks in the particular chunk since the beginning of the time interval. It will be appreciated that the contents of the number of reads field 73(e) and the number of writes field 76(e) should equal the contents of the total accesses field 72(e).

The other fields 74(e) and 75(e) provide information as to whether the tracks in the chunk are being relatively randomly accessed on a widely-distributed manner during the time interval. In particular, the read hit rate field 74(e) identifies the rate at which, during retrieval operations in connection with tracks in the chunk, the host adapters 24(n) determine that the tracks are in the cache memory 31 of the master mass storage, subsystem 12M; it will be appreciated that the one minus the read hit rate provides a read miss rate, which, in turn, identifies the rate at which, during retrieval operations in connection with tracks in the chunk, the host adapters 24(n) determine that the tracks are not in the cache memory 31 of the master mass storage subsystem 12M and therefore need to be staged either from the respective storage device 22 of the master mass storage subsystem 12M or from the cache memory of the slave mass storage subsystem 12S. The number of misses field 75(e), on the other hand, identifies the number of times, during the time interval, during either a retrieval operation or a storage operation, the respective host adapter 24(n) determines that the respective track is not in the cache memory 31 of the master mass storage subsystem 12M. The host adapters 24(n) can, when they initiate retrieval and storage operations in connection with information from tracks in respective chunks, update the statistics in the entries 70(e) associated with the respective chunks.

At the end of each time interval, the master mass storage subsystem's remote interface 15 processes the entries in the chunk statistics table 70 to identify a predetermined number of the particular chunks for which it will enable the slave mass storage subsystem 12S to transfer the identified chunks from the respective storage devices to its cache memory for use during the next time interval. It will be appreciated that, for such of the identified chunks which are already in the slave mass storage subsystem's cache memory, the slave mass storage subsystem need not transfer them to the cache memory again. It will further be appreciated that the remote interface 15 may use several criteria, either individually or in combination, in identifying the chunks to be cached by the slave mass storage subsystem' cache memory. For example, the remote interface 15 can identify the chunks for which the total number of misses, as indicated by number of misses fields 75($e$) of the various entries 70($e$), were greatest during the time interval. Alternatively, the remote interface 15 can identify the chunks for which the read hit rate was lowest, as indicated by the read hit rate fields 74($e$) of the various entries 70($e$); it will be appreciated, however, that, if the identification of the chuncks to be cached in the cache memory of the slave mass storage subsystem 12S is based on the read hit rate, preferably the number of retrieval operations (as indicated by the contents of the number of reads fields 73($e$)) and/or the total number of retrieval and storage operations (as indicated by the contents of the total accesses fields 72($e$)) will also be taken into account, to ensure that there is at least a minimum amount of access activity in connection with the tracks in the chunk. In any case, the remote interface can also take into account the number of storage operations (as indicated by the contents of the number of writes fields 76($e$) in the respective entries 70($e$)) to identify as the chunks to be cached in the cache memory of the slave mass storage subsystem 12S, for example, the chunks, among those for which there were the highest number of misses, only those for which there were the lowest number of storage operations, thereby to provide enhanced emphasis on the retrieval activity in connection with tracks in the respective trunks.

The slave cache table 80 (FIG. 4) identifies the tracks for those chunks which are cached in the cache memory of the slave mass storage subsystem 12S. The remote interface 15 updates the slave cache table 80 at the end of each time interval to reflect the particular identified chunks which are to be cached by the cache memory of the slave mass storage subsystem 12S for the next time interval. The host adapters 24($n$) can, if it determines that a track from which information is to be retrieved is not associated with a cache slot 32($s$) as described above in connection with FIG. 1, use the slave cache table 80 to determine whether the track is in a chunk whose information is currently being cached in the slave mass storage subsystem 12S. If a host adapter 24($n$) determines from the slave cache table 80 that such a track (that is, the track from which information is to be retrieved) is in the cache memory of the slave mass, storage subsystem 12S, then it can enable the remote interface 15 to initiate a staging operation to stage the information from the track from the slave mass storage subsystem's cache memory, rather than enable the data store 20($m$) which contains the track to perform a staging operation for the track.

With reference to FIG. 4, the slave cache table 80 in one embodiment comprises a bit map organized in a plurality of rows and columns, including a plurality of columns 81($l$) through 81(D) (generally identified by reference numeral 81($d$)), each associated with a storage device 22. Each column 81($d$) includes a plurality of rows 81($d$)($l$) through 81($d$)(R) (generally identified by reference numeral 81($d$) ($r$)) associated with successive tracks within the respective storage device 22. In one embodiment, all of the storage devices 82 have the same number of tracks, and in that embodiment all of the columns 81($d$) will have the same number "R" of rows; it will be appreciated, however, that in embodiments for which storage devices may have differing numbers of tracks, the number of rows may differ as among the various columns, to correspond to the number of tracks in the respective storage device. In any case, each row in each column comprises a flag, which may comprise a digital bit, which can be set and cleared by the remote interface 15 to reflect the cached status of the respective tracks in the cache memory of the slave mass storage subsystem 12S.

Figure 5:
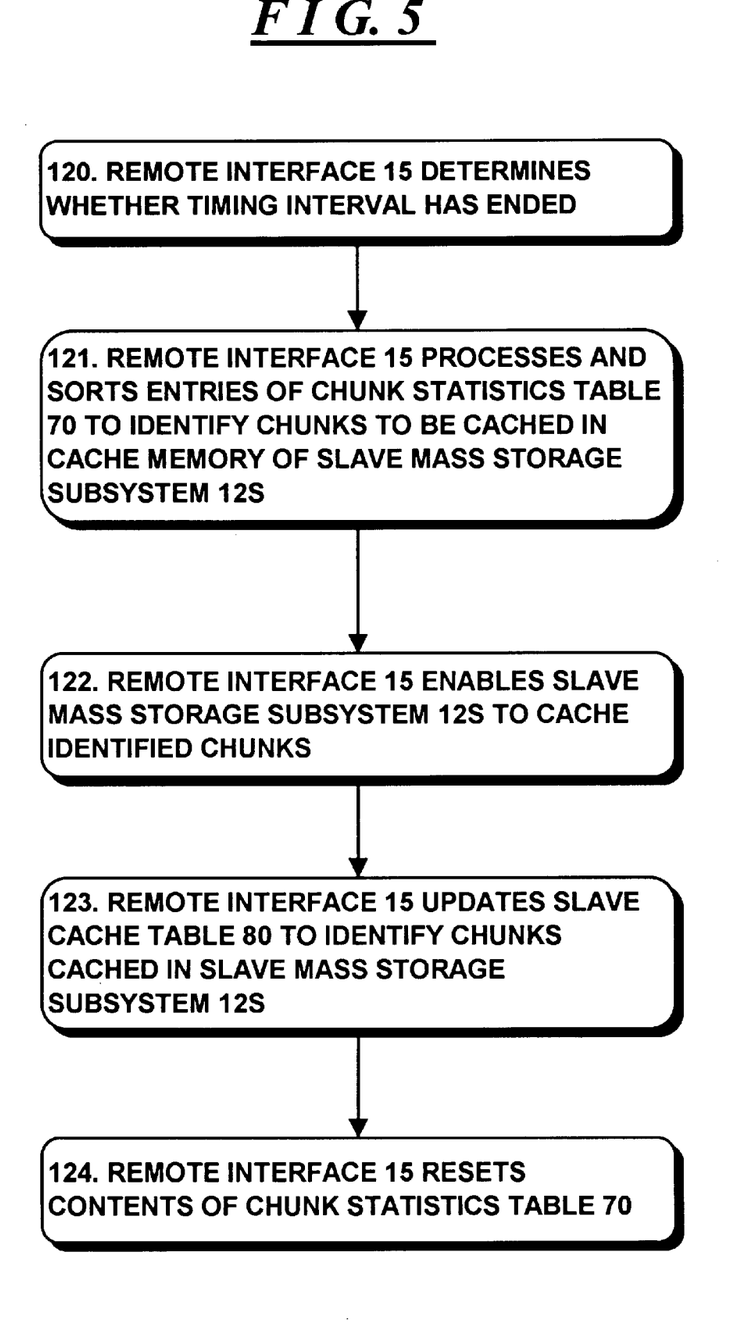
FIGS. 5 through 6A are flow-charts which are useful in understanding the invention.
Figure 6:
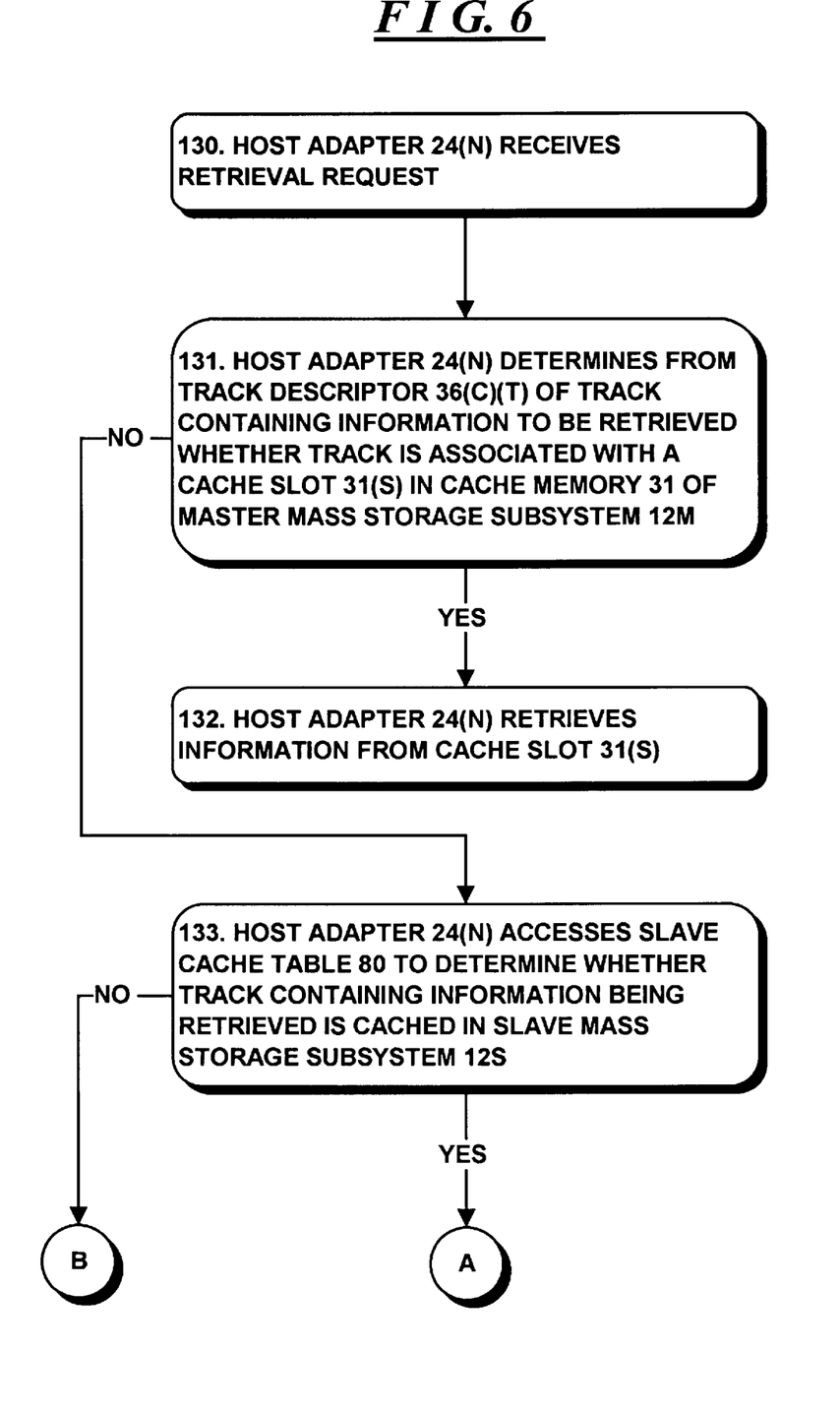
Figure 6A:
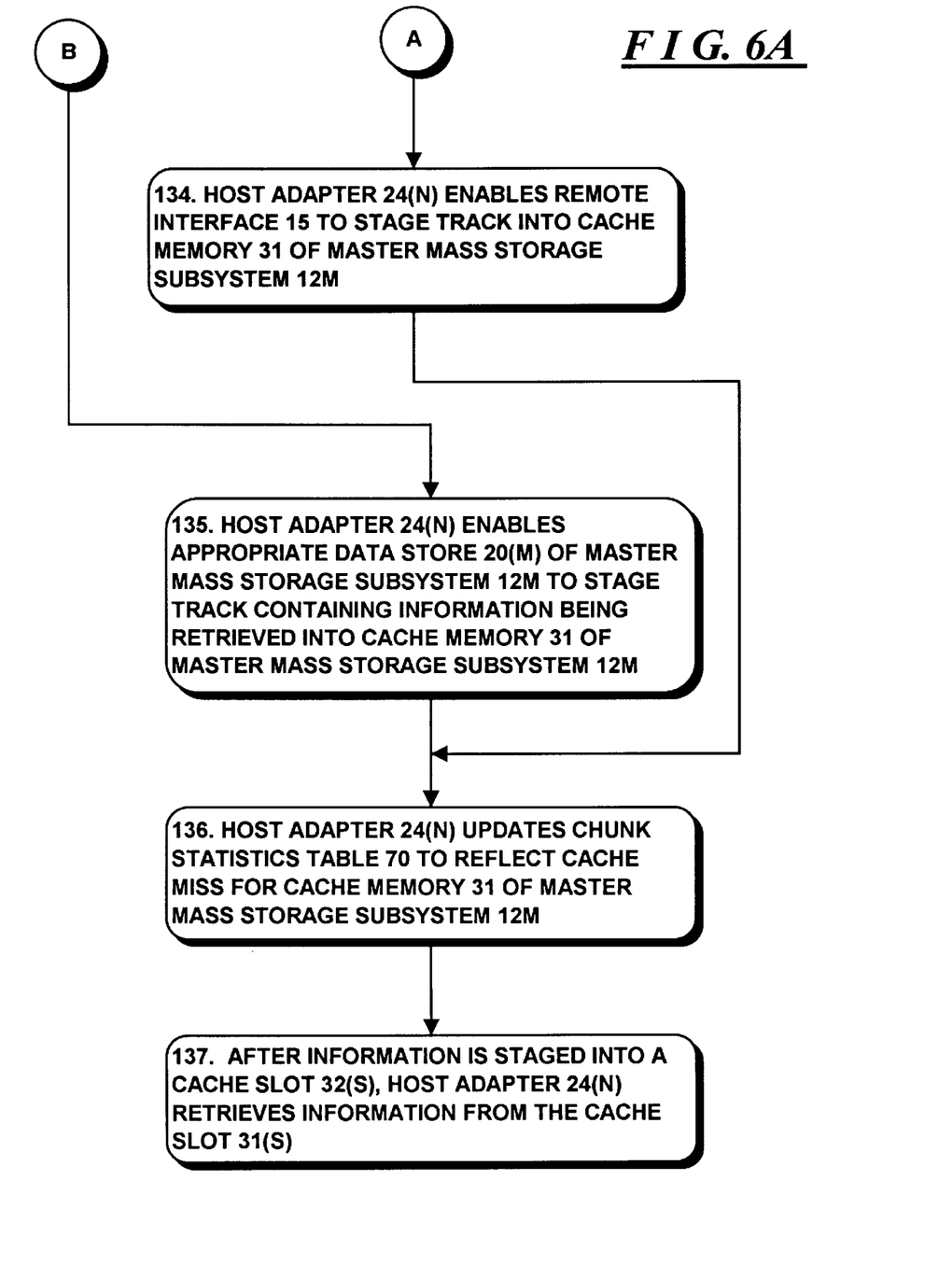

Operations described above in connection with the invention are depicted on the flow-charts in FIGS. 5 through 6A. Since the operations as depicted in those flow-charts will be readily apparent to those skilled in the art from the above description, the flow-charts in those FIGS. will not be separately described in this specification. The flow-chart in FIG. 5 depicts operations performed by the remote interface 15 in periodically processing the chunk statistics table 70 to identify the chunks to be cached in the slave mass storage subsystem's cache memory, enabling the slave mass storage subsystem 12S to cache the identified chunks, and updating the slave cache table 40. The flow-chart in FIGS. 6 and 6A depicts operations performed by the host adapters in connection with an access operation and updating of the chunk statistics table 70 in the event of a cache miss with the master mass storage subsystem's cache memory 31.

It will be appreciated that numerous modifications may be made in connection with the invention. For example, although the invention has been described in connection with a master mass storage subsystem 12M utilizing the cache memory of a slave mass storage subsystem 12S to cache information from tracks in respective chunks of the storage devices 22, it will be appreciated that the master mass storage subsystem 12M may itself perform such caching. Accordingly, such caching can readily be performed by a single mass storage subsystem, such as master mass storage subsystem 12M, providing, preferably, that the subsystem includes a sufficiently large cache memory 31 that allocating large portions of the cache memory 31 to such caching that its other caching is not adversely affected.

In addition, it will be appreciated that both mass storage subsystems may perform operations described above for the respective master and slave mass storage subsystems. That is, if the mass storage subsystem identified by reference numeral 12S performs storage and retrieval operations in connection with host computers (not shown) connected thereto, and stores information used thereby, the mass storage subsystem identified by reference numeral 12M may perform mirrored storage in connection with information from the mass storage subsystem 12S. In that case, if, for example, the cache memory of one of the mass storage subsystems 12M or 12S is not "heavily stressed," which can occur, for example, if, the rate of cache memory accesses for one of the cache memories is much less than the rate for the other cache memory, a portion of the one cache memory may be used to prefetch information for access by the other mass storage subsystem as described above.

Furthermore, although the invention has been described in connection with aggressively prefetching chunks that are to be cached during a time interval, based on statistics that are generated for operations in connection with the previous time interval, it will be appreciated that other criteria may instead or additionally be usefully employed to determine which chunks will be cached. For example, the remote interface 15 may also maintain statistics as to the particular chunks which are cached during each time interval during, for example, successive days or weeks, and, if it determines various patterns, may cache those chunks for the appropriate time interval, regardless of the statistical determination described above in connection with FIG. 3. This may occur if, for example, particular types of operations are performed in an enterprise at particular times of day or at particular times during the week, and if information relating to those operations are stored in particular chunks.

In addition, although particular types of statistics and statistical criteria have been described as being used in the determination of which chunks to cache, it will be appreciated that other types of statistics and statistical criteria may advantageously be used. Furthermore, although the slave cache table 80 has been described as including one row 81(*d*)(*r*) associated with each track, it will be appreciated that the table 80 may have one row 81(*d*)(*r*) associated with each chunk. In that case, if each storage device 22 includes, for example, $2^T$ tracks, and if there are $2^C$ tracks per chunk, then there need only be $2^{T-C}$ rows in the slave cache table 80. For each chunk, the high-order portions (specifically, the high-order T-C bits) of the track identifiers for the tracks in the chunk will all have the same binary-encoded value, so that the host adapters 24(*n*), in order to determine whether a particular track is being cached in the slave mass storage subsystem 12S in accordance with this aggressive prefetch aspect of the invention, can determine the particular row whose flag will indicate the cached status of the chunk by using the high-order T-C bits of the track.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A mass storage system comprising:
   A. a cache memory;
   B. a data store configured to store information in chunks each having a plurality of blocks, each block having at least one item of information, and in response to a staging request, perform a staging operation to copy information from one of said blocks into said cache;
   C. a host adapter configured to perform access operations in connection with information cached in said cache memory, the host adapter being configured to, during an access operation, initially determine whether the information to be accessed is in the cache memory and, if not, generate a staging request to enable the data store to perform a staging operation to copy the information to be accessed into the cache memory and update cache miss information associated with one of said chunks containing the block; and
   D. a chunk cache control configured to periodically process the cache miss information associated with a plurality of said chunks to select said chunks whose information is to be cached, and to enable information from the selected chunks to be copied into the cache memory.

2. A mass storage system as defined in claim 1 in which said host adapter is configured to perform said access operations in response to access requests from a host computer.

3. A mass storage system as defined in claim 1 further comprising a chunk statistics table including at least one entry associated with a respective one of said chunks, said at least one entry including at least one field for receiving cache miss information associated with the respective one of the chunks, the host adapter being further configured to update the cache miss information in the entry associated with the respective chunk.

4. A mass storage system as defined in claim 3 in which:
   A. said chunk statistics table includes a plurality of entries each associated with a respective one of said chunks, said entries each including at least one field for receiving cache miss information associated with the respective chunk,
   B. the host adapter is further configured to, when it determines that information to be accessed during an access operation is not in the cache memory, update the cache miss information in the entry of the chunk statistics table that is associated with one of the chunks containing the information to be accessed.

5. A mass storage system as defined in claim 3 in which:
   A. said chunk statistics table includes a plurality of entries each associated with a respective one of said chunks, said entries each including at least one field for receiving cache miss information associated with the respective chunk,
   B. the chunk cache control is further configured to periodically process the cache miss information in said entries of said chunk statistics table to identify the selected chunks whose information is to be cached, and to enable information from the selected chunks to be copied into the cache memory.

6. A mass storage system as defined in claim 3 in which the chunk cache control is further configured to select said chunks whose cache miss information indicates a relatively large number of cache misses over a predetermined time period.

7. A mass storage system as defined in claim 3 in which the chunk cache control is further configured to reset the cache miss information in said entries.

8. A mass storage system is defined in claim 1
   A. in which:
      i. the cache memory comprises a main cache memory and a chunk cache memory;
      ii. the data store is further configured to, in response to a staging request, perform a staging operation to copy information from one of said blocks into said main cache memory;
      iii. the host adapter is further configured to perform access operations in connection with information cached in said main cache memory; and iv. the chunk cache control is further configured to enable information from the selected chunks to be copied into the chunk cache memory;

B. said mass storage subsystem further comprising a cached chunk table identifying the ones of said chunks cached in the chunk cache memory, C. the host adapter is further configured to, if it determines that the information to be retrieved is not in the main cache memory, use the cached chunk table to determine whether the chunk containing the information to be retrieved is cached in the chunk cache memory, and, if so, generate a transfer request for the chunk cache control; and D. the chunk cache control is further configured to, in response to a transfer request from the host adapter, transfer the information to be retrieved to the main cache memory.

9. A mass storage system as defined in claim 8 in which said main cache memory, said data store as a master data store and said host adapter form a master mass storage subsystem, said mass storage system further including a slave mass storage subsystem including said chunk cache memory and at least one slave data store, the slave data store storing information in a mirrored storage arrangement mirroring the information stored in said master data store, the chunk cache control being further configured to interconnect said master mass storage subsystem and said slave mass storage subsystem.

10. A method of operating a mass storage system of the type comprising i. a cache memory;

ii. a data store configured to store information in chunks each having a plurality of blocks, each block having at least one item of information, the data store being further configured to, in response to a staging request, perform a staging operation to copy information from one of said blocks into said cache;

iii. a host adapter configured to perform access operations in connection with information cached in said cache memory, the host adapter being configured to, during an access operation, initially determine whether the information to be accessed is in the cache memory and, if not, generate a staging request to enable the data store to perform a staging operation to copy the information to be accessed into the cache memory and update cache miss information associated with the one of said chunks containing the block;

the method comprising the steps of:

A. updating cache miss information associated with the one of said chunks containing the block when the host adapter determines during an access operation that the information to be accessed is not in the cache memory; and B. periodically processing the cache miss information associated with a plurality of said chunks to select ones of said chunks whose information is to be cached, and C. copying information from the selected chunks into the cache memory.

11. A method as defined in claim 10 further comprising the step of providing access requests to the host adapter, the host adapter performs said access operations in response to said access requests.

12. A method as defined in claim 10, the mass storage subsystem further comprising a chunk statistics table including at least one entry associated with a respective one of said chunks, said at least one entry including at least one field for receiving cache miss information associated with the respective one of the chunks, the cache miss information update step including the step of adapter updating the cache miss information in the entry associated with the respective chunk.

13. A method as defined in claim 12, the chunk statistics table including a plurality of entries each associated with a respective one of said chunks, said entries each including at least one field for receiving cache miss information associated with the respective chunk, the cache miss information update step including the step of updating the cache miss information in the entry of the chunk statistics table that is associated with the one of the chunks containing the information to be accessed.

14. A method as defined in claim 12, the chunk statistics table includes a plurality of entries each associated with a respective one of said chunks, said entries each including at least one field for receiving cache miss information associated with the respective chunk, in which B. during the cache miss information processing step, periodically processing the cache miss information in said entries of said chunk statistics table to identify the selected chunks whose information is to be cached, C. during the information copying step, copying information from the selected chunks into the cache memory.

15. A method as defined in claim 12 in which, during the cache miss information processing step, the ones of said chunks whose cache miss information indicates a relatively large number of cache misses over a predetermined time period are identified.

16. A method as defined in claim 12 further comprising the step of resetting the cache miss information in said entries after said cache miss information processing step.

17. A method as defined in claim 10, the method being for use in connection with the mass storage system i. in which:
  a) the cache memory comprises a main cache memory and a chunk cache memory;
  b) the data store is further configured to, in response to a staging request, perform a staging operation to copy information from one of said blocks into said main cache memory;
  c) the host adapter is further configured to perform access operations in connection with information cached in said main cache memory; and
  d) the chunk cache control is further configured to enable information from the selected chunks to be copied into the chunk cache memory;

ii. said mass storage subsystem further comprising a cached chunk table identifying the ones of said chunks cached in the chunk cache memory, the method further comprising the steps of:

A. in response to a determination that the information to be retrieved is not in the main cache memory, using the cached chunk table to determine whether the chunk containing the information to be retrieved is cached in the chunk cache memory; and B. if so, transfer the information to be retrieved from the chunk cache memory to the main cache memory.

18. A method as defined in claim 17, the method being for use in connection with the mass storage system in which said main cache memory, said data store as a master data store and said host adapter form a master mass storage subsystem, said mass storage system further including a slave mass storage subsystem including said chunk cache memory and at least one slave data store, the slave data store storing information in a mirrored storage arrangement mirroring the information stored in said master data store, in which, during the information copying step, copying the information from the slave data store to the chunk cache memory.

* * * * *